United States Patent [19]
Boyd

[11] Patent Number: 5,309,960
[45] Date of Patent: May 10, 1994

[54] CUP HOLDER FOR USE IN A BEVERAGE PROCESSING MACHINE

[75] Inventor: David D. Boyd, Portland, Oreg.

[73] Assignee: Boyd Coffee Company, Portland, Oreg.

[21] Appl. No.: 64,821

[22] Filed: May 19, 1993

[51] Int. Cl.$^5$ .................... A47J 31/54; B67D 1/12
[52] U.S. Cl. ..................... 141/247; 141/98; 141/1; 141/391; 141/372; 141/369; 99/452; 99/300
[58] Field of Search ........... 141/1.84, 98, 247, 391, 141/369, 370, 372, 377, 378; 99/30, 452

[56] References Cited

U.S. PATENT DOCUMENTS

| | | | |
|---|---|---|---|
| 1,576,214 | 3/1926 | Paskal | 141/372 |
| 2,281,727 | 5/1942 | Stewart | 141/370 X |
| 2,349,531 | 5/1944 | Weir | |
| 2,598,665 | 6/1952 | Levings | 141/372 |
| 2,989,093 | 6/1961 | Stiebel | |
| 3,341,242 | 9/1967 | Carson | |
| 3,469,521 | 9/1969 | Simjian | |
| 4,108,220 | 8/1978 | Pantek | |
| 4,164,964 | 8/1979 | Daniels | 141/372 X |
| 4,590,974 | 5/1986 | Mathews | 141/247 X |
| 4,632,024 | 12/1986 | Cortese | 99/300 X |
| 4,662,271 | 5/1987 | Woltermann | |
| 4,757,753 | 7/1988 | Pandolfi | |
| 4,856,681 | 8/1989 | Murray | 141/372 X |
| 5,123,458 | 6/1992 | Collard | 141/1 |

FOREIGN PATENT DOCUMENTS 8902990 7/1991 Netherlands .................. 141/198

*Primary Examiner*—Ernest G. Cusick
*Attorney, Agent, or Firm*—Kolisch Hartwell Dickinson McCormack & Heuser

[57] ABSTRACT

A cup holder is provided which is suited for attachment to a spout of a conventional beverage preparation machine so as to support a cup in a fluid-receiving orientation adjacent to such spout. The cup holder includes a base which is configured for securement to the spout, and a U-shaped cup-gripping member which includes a pair of space side walls separated by generally horizontal floor. One of the side walls extends from the base to the floor and the second side wall extends upwardly from the floor and terminates arcuately to provide a seat for a cup's lip. The arc of the second side wall is similar in shape to the side edge of a conventional lipped cup, accommodating angular placement of the cup on the second side wall during filling of the cup.

10 Claims, 2 Drawing Sheets

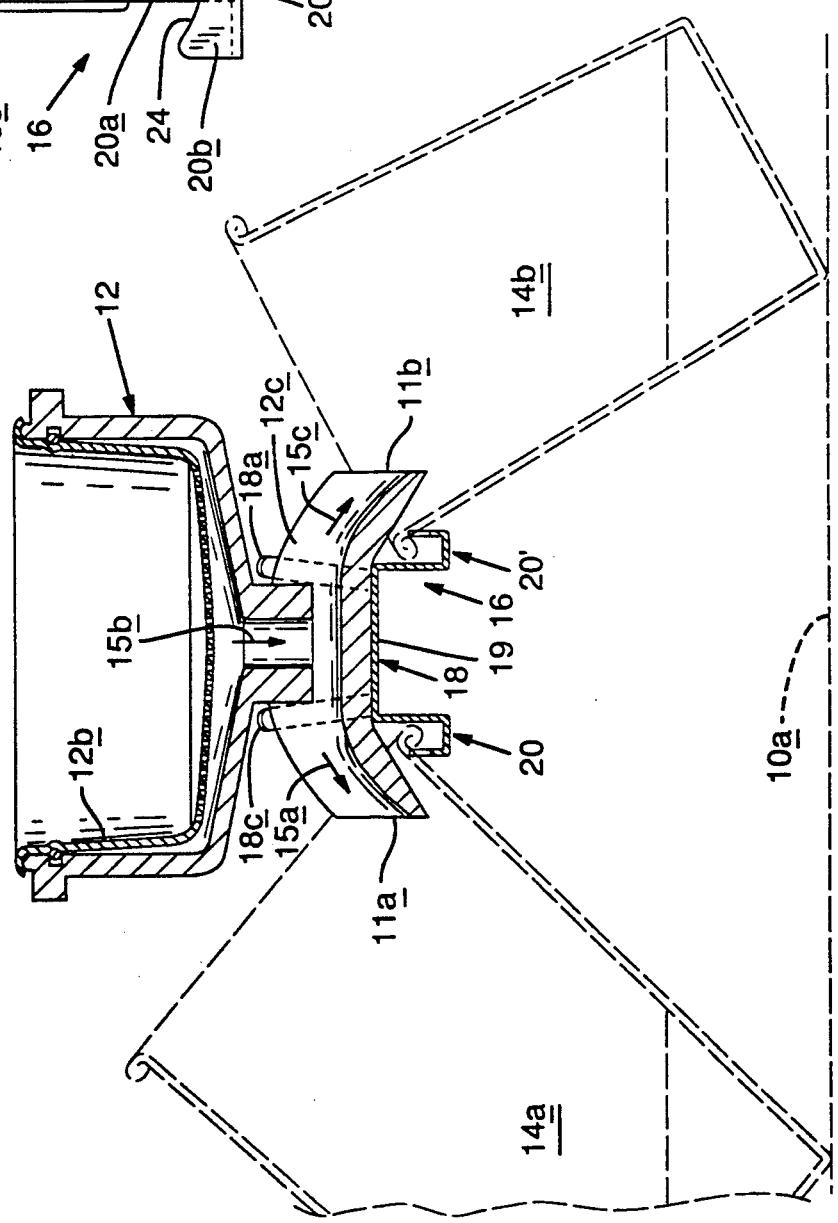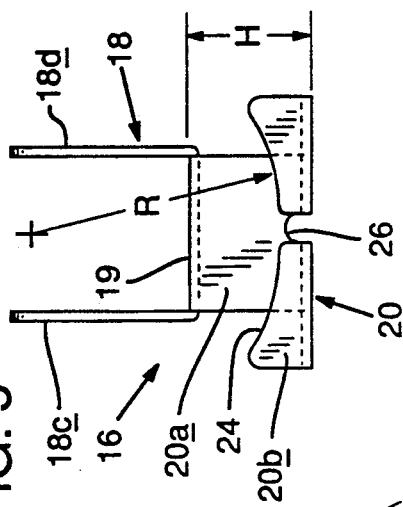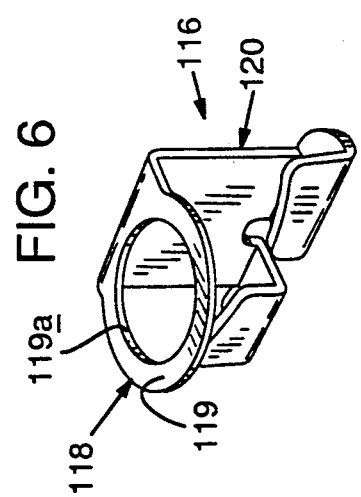

CUP HOLDER FOR USE IN A BEVERAGE PROCESSING MACHINE

TECHNICAL FIELD

The present invention relates generally to cup holders, and more particularly to a device for use in holding paper cups in beverage preparation machines. Although the invention is suitable for use in a variety of such machines, it has proven particularly well suited for use in espresso brewing equipment where space is limited and high-temperature liquids are employed. Consequently, the invention is described below in the context of a conventional espresso brewing machine, such machine including a filter assembly with a spout to which the invented cup holder is secured.

BACKGROUND OF THE INVENTION

In a conventional espresso brewing machine, beverages are prepared by passing a measured amount of hot water through a filter which carries ground espresso beans. Upon passing through the filter, the water picks up particles, transforming the water into espresso for consumption, either alone or in an espresso drink. Commonly, the final product takes the form of a "latte", a beverage which includes espresso garnished with a quantity of steamed milk.

In known espresso brewing machines, filters are generally removably mounted on the machine by way of filter assemblies which include both the filter and a spout with a channel through which the espresso is to be poured. In some machines, filter assemblies include spouts with plural channels, the espresso being divided substantially equally between the channels as it is brewed. In either case, the espresso falls from the spouts and into a low-profile container (usually a small pitcher) which rests on a platform a short distance therebelow. The espresso is then transferred to a large cup and garnished to achieve the desired look and taste.

Although a seemingly simple procedure, the above-described routine is inadequate in several respects. First, there exists an unnecessary step: the transfer of espresso from the container to the cup where the final beverage is prepared. This step is particularly cumbersome where a high volume of beverages are prepared, as is the case in coffeeshops, restaurants and street vendor stands. Such step adds to the time required to prepare espresso drinks, resulting in a loss of customers and thus in a loss of profits. There is also a loss of heat with each espresso transfer, an event which is particularly undesirable in espresso drinks where the temperature of the beverage greatly impacts on the beverage's taste.

One solution to the problems outlined above would be to simply place the cup below the spout from which espresso is poured, thus eliminating the intermediate step. This solution, however, is obviated by size restrictions of conventional espresso brewing machines, such machines including characteristically limited clearance between the spout and the platform below. Although the clearance provided is generally sufficient for small porcelain cups which have historically been used, it does not accommodate the use of the taller paper cups which have become popularized in the United States. To increase the space between the spout and the platform would involve a substantial increase in the cost of the machine due to the increase in materials, and would lead to problems of fluid spatter when smaller cups were used.

Physically holding cups in position beneath the spouts is also an unacceptable solution inasmuch as such procedure would still limit the operator's ability to perform other tasks. A need has therefore developed for a cup holder which is suited to hold a cup in position relative to the fluid spout of the filter without requiring redesign of conventional espresso brewing machines and speed-up brewing production.

Another problem with conventional espresso brewing machines which use filter assemblies is that such assemblies are commonly removed from the espresso machine to be refilled after each espresso drink is made. The machine operator will often set the filter down so as to grind additional beans or prepare another drink, the filter often being placed directly on a surface which may include contaminants such as bacteria or the like. A need has therefore arisen for a non-obtrusive stand which may be used to keep the filter's sterile surfaces out of contact with contaminants on the surface on which the filter is to be set down.

SUMMARY OF THE INVENTION

The invented cup holder addresses the problems set forth above, the cup holder taking the form of an interface structure which is suited for attachment to an espresso brewing machine's filter assembly so as to support a lipped cup in a fluid-receiving orientation adjacent to the filter assembly's spout. The invented device includes a base which is configured for securement to the filter assembly's spout, and a U-shaped cup-gripping member which includes a pair of space side walls separated by generally horizontal floor. One of the side walls extends from the base to the floor, and the other side wall extends upwardly from the floor, terminatory arcuately to provide a seat for the cup's lip. The arcuate edge of the second side wall is arced so as to emulate the contours of the side edge of a conventional cup, accommodating angular placement of the cup on the lip during filling of the cup. The curvature accommodates various size and style cups, allowing for the use of a single cup holder to hold various size cups.

Because the support members extend downwardly from the spouts, an excellent filter assembly stand is also provided by the cup-gripping member. The cup-gripping member extends downwardly from the filter assembly further than the lowermost region of the filter assembly spout. The filter assembly spout is thus kept away from contact with contaminants which may be on the reference surface on which the filter assembly is placed. The present invention thus provides a stand without compromising the effectiveness of the filter.

These and other objects and advantages of the present invention will be more readily understood upon review of the drawings and the detailed description of the preferred embodiment which follows.

BRIEF DESCRIPTION OF THE DRAWINGS

FIG. 4 is a sectional view taken generally along lines 4—4 in FIG. 2 and illustrating the holder's use to maintain angular position of a pair of different size cups.

FIG. 5 is an end view of the cup holder shown in FIG. 3.

FIG. 6 is an isometric view of a second embodiment of the invention.

DETAILED DESCRIPTION OF THE PREFERRED EMBODIMENT AND BEST MODE OF CARRYING OUT THE INVENTION

Figure 1:
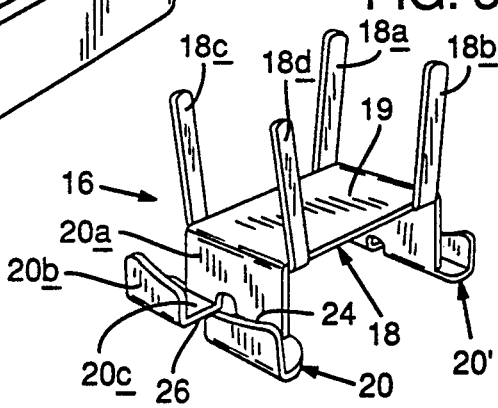
FIG. 1 is an isometric view of an espresso brewing machine of conventional design, the machine's filter assembly having been fitted with a preferred embodiment cup holder so as to accommodate filling of a pair of different size cups.

Referring first to FIG. 1 and providing a background whereby the invention may be understood, it will be noted that a conventional espresso brewing machine 10 is shown in simplified form, such machine including platform portion 10a on which cups or containers may be placed for receipt of espresso. The depicted machine further includes an upstanding brew portion 10b, the brew portion being that part of the machine which prepares water for passage through removable filter assembly 12 so that espresso may be made. As indicated, the machine's brew portion has a variety of controls which dictate the temperature and quantity of water to be passed through the filter assembly and into adjacent cups such as those shown at 14a and 14b.

Figure 2:
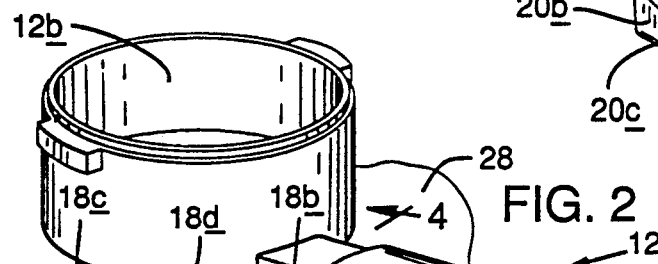
FIG. 2 is an isometric view of the espresso brewing machine's filter assembly, the preferred cup holder having been attached thereto and supporting the filter assembly on a reference surface.

Turning now to FIGS. 2 and 4, and focusing attention more directly on the filter assembly to which the invented cup holder is applied, it will be noted that such filter assembly includes a handle 12a, a filter 12b and a spout 12c. The spout arrangement includes a pair of oppositely facing channel sections 11a, 11b, each including a channel which extends in a direction of desired espresso flow. Espresso thus flows from the filter and into the spout, following a path indicated generally by arrow 15a, and then splits into two separate streams which flow in the directions indicated generally by arrows 15b and 15c.

Those skilled in the art will recognize that, although the just-described dual spout arrangement is chosen to provide a context in which to describe the preferred embodiment cup holder, various style spouts are available. The present invention is therefore described for use on various style filter assemblies, three different embodiments of the invention having been depicted and described.

In order to provide for the positioning of common paper cups within a conventional espresso brewing machine, a cup holder has been developed which holds such cups in angular orientation as shown in FIG. 1. A preferred embodiment of the invented cup holder is indicated generally at 16 in FIGS. 1 through 5, such cup holder being particularly well suited for attachment to a filter assembly having a dual-channel spout.

In order to accommodate securement of the cup holder to the filter assembly as will be described below, the cup holder is made of a thin gauge metal, preferably being within the range of between 20 gauge and 22 gauge. The cup holder is preferably either stamped or cut and folded so as to define a piece of the shape shown in FIG. 3.

Figure 3:
FIG. 3 is an isometric view of the preferred cup holder prior to its attachment to the filter assembly.

Cup holder 16, it will be noted, includes a base 18 which is configured to accommodate securement to the filter assembly's spout. As best indicated in FIG. 3, the base employs plural fingers (or tabs) 18a, 18b, 18c, 18d, each of which is deformable to at least partially wrap around one of the channel sections of the spout (see FIGS. 1 and 2). It is important, however, that the fingers do not obstruct the flow of espresso within the channels as will be understood by those skilled in the art. To increase stability of the cup holder, it is further fitted with a substantially planar brace 19 which rests against the bottom of the filter assembly spout as best indicated in FIG. 4.

Extending downwardly from one side of the cup holder's brace is a cup-gripping member 20, such member serving to engage the cup and hold it in a fluid-receiving orientation as shown. The cup-gripping member is generally U-shaped, including a pair of generally vertical side walls 20a, 20b separated by a generally horizontal floor 20c. A first one of the side walls extends downwardly from brace 19 to intersect with floor 20c. The first side wall has a height H (see FIG. 5) which places floor 20c below the spout's lowermost regions 22 (see FIG. 2). The second side wall extends upwardly from the floor, terminating in an arcuate edge 24. Such arcuate edge, it will be appreciated, is of a radius R which corresponds generally to the exterior diameter of a conventional paper cup in the area adjacent its lip. Because different size cups are used by most espresso vendors, a radius has been chosen which may be used to hold various size cups, such radius generally being on the order of approximately 1-inch. A slot 26 bisects the cup-gripping member, extending across the floor and up the second side wall so as to accommodate dripping of fluid which collects on the floor rather than allowing such fluid to run down the side of the cup.

In the preferred embodiment, where a dual channel spout is employed, a second cup-gripping member 20' is provided on the opposite side of the planar brace, such member being substantially a mirror image of member 20.

As best shown by dashed lines in FIG. 4, the cup holder is capable of capturing a pair of different size cups 14a, 14b and holding them in angular fluid-receiving orientations, the lower edges of such cups resting on the machine's platform 10a. The lips of the cups rest on the arcuate edges of the second side walls, there being sufficient space between the edges and the corresponding channel sections to allow insertion of the cup's lip therebetween. The platform of the espresso brewing machine is generally graded so as to provide frictional resistance to sliding motion of the cups which would otherwise spill their contents. This is aided by the weight of the espresso contained within the cup, such weight tending to create a force moment pushing down toward the point of contact between the cup and the platform of the espresso machine. This makes for stable positioning of the cups while espresso is being poured, reducing the risk of spillage and the corresponding loss of time and money associated therewith. The machine operator is further protected from injury due to the stable cup position and the absence of any need to hold the cup while espresso is poured.

As an additional advantage of the invented device, it will be noted that the floor portions of the cup holder's cup gripping members may act as stands on which the cup holder sits when not applied to the espresso machine. This serves to raise the channel sections from contact with the reference surface 28, a surface which may contain contaminants, presenting a health danger to espresso drinkers. Raising the channel sections is made possible due to the length of the second walls of cup gripping members 20 and 20', the floors thus serving to support the filter assembly in conjunction with the assembly's handle 12a.

Figure 7:
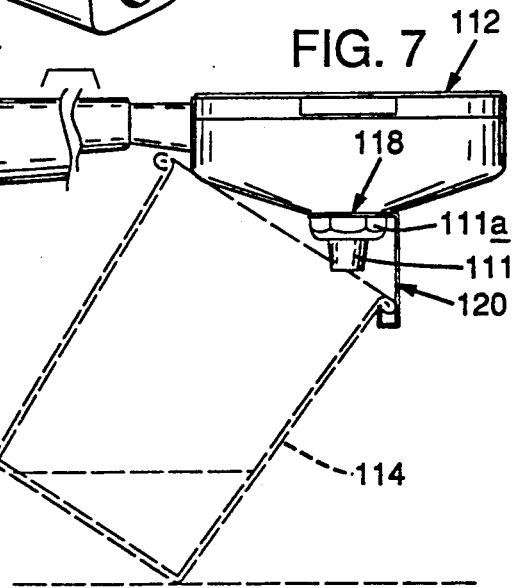
FIG. 7 is an isometric view of a second filter assembly, the cup holder of FIG. 6 having been attached thereto.

Focusing attention now on FIGS. 6 and 7, it will be appreciated that the invented cup holder may similarly be formed so as to attach to a filter assembly 112 which includes a spout composed of a single vertical channel section 111. One embodiment of such a cup holder is depicted in FIG. 6 and indicated generally at 116. As indicated, cup holder 116 includes a base 118 and cup-gripping member 120, the cup-gripping member being substantially similar to the cup-gripping members of cup holder 16. The base, however, is different from base 18 in order to provide for stable securement of the cup holder to the filter assembly's spout. Base 118 includes a generally planar brace 119, such brace defining an aperture 119a which receives channel section 111. The channel section is threaded, a nut 111a being screwed onto the channel section over brace 118 so as to hold the cup holder in place. The cup-gripping member's floor extends beneath the brace, so as to accommodate positioning of a cup 114 as shown in FIG. 7. This arrangement, it will be appreciated is opposite to that shown in FIGS. 1 through 5 where the floors of the cup-gripping member extend outwardly.

Figure 8:
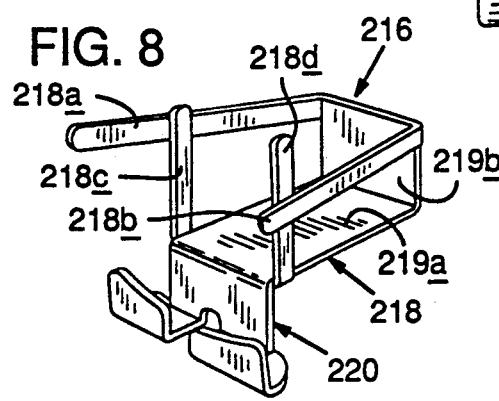
FIG. 8 is an isometric view of a third embodiment of the invention.

FIG. 8 shows still another embodiment of the invented cup holder, such cup holder being indicated generally at 216. Cup holder 216 includes a base 218 and a single cup-gripping member 220, the cup-gripping member being substantially similar to the cup-gripping member of cup holder 16. The base, however, has been modified to accommodate attachment to a filter assembly with a single angularly extending channel section. Toward this end, the base includes a horizontal brace 219a which engages the undersurface of the filter's spout (not shown) and a vertical brace 219b which engages the rear end of the filter's spout (not shown). Plural fingers (or tabs) 218a, 218b, 218c, 218d wrap around the spout to secure the cup holder thereto.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. A cup holding device for use in a beverage processing machine which expels fluid into a lipped cup through a spout, the device comprising:
   a base configured for securement to the machine's spout;
   a cup-gripping member including a first side wall which extends downwardly from said base, a floor which extends generally horizontally from said first side wall, and a second side wall spaced from said first side wall, said second side wall extending upwardly from said floor and terminating arcuately to provide a seat for a cup's lip.

2. The cup holder of claim 1, wherein said base includes one or more elongate tabs selectively deformable to secure the cup holder to the spout.

3. The cup holder of claim 1, wherein said base includes a pair of facing elongate tabs, said tabs being deformable to pinch the spout for securing the cup holder to the spout.

4. The cup holder of claim 1, wherein said base defines an aperture through which the spout passes when the cup holder is secured to the spout.

5. The cup holder of claim 1, wherein said cup-gripping member includes a slot.

6. The cup holder of claim 5, wherein said slot bisects said floor.

7. The cup holder of claim 1, wherein said second side wall terminates upwardly in an arc having a radius of approximately 1-inch.

8. A cup holding device for use in a beverage processing machine which expels fluid into lipped cups through a double-opening spout, the device comprising:
   a base configured for securement to the machine's spout;
   a pair of cup-gripping members, each including a first side wall which extends downwardly from said base, a floor which extends generally horizontally from said first side wall, and a second side wall spaced from said first side wall, said second side wall extending upwardly from said floor and terminating arcuately to provide a seat for a cup's lip.

9. The cup holder of claim 8, wherein said floors of said cup-gripping members extend in opposite directions for supporting cups in oppositely angled orientations.

10. A cup holding device for use in a beverage processing machine which expels fluid into a lipped cup through a spout of a removable filter assembly, the device comprising:
    a base configured for securement to the machine's filter assembly;
    a cup-gripping member including a first side wall which extends downwardly from said base to a position below a lowermost region of the filter assembly's spout, a floor which extends generally horizontally from said first side wall, and a second side wall spaced from said first side wall, said second side wall extending upwardly from said floor and terminating arcuately to provide a seat for a cup's lip;
    said cup-gripping member thus providing a stand which elevates said spout above a reference surface when the filter assembly is removed and placed on the reference surface.

* * * * *